United States Patent [19]

Clark et al.

[11] Patent Number: 5,283,369
[45] Date of Patent: Feb. 1, 1994

[54] SELECTIVE SYNTHESIS OF MERCAPTANS AND CATALYST THEREFOR

[75] Inventors: Roger T. Clark; James A. Elkins, Jr., both of Chester, Pa.

[73] Assignee: Elf Atochem North America, Inc., Philadelphia, Pa.

[21] Appl. No.: 856,232

[22] Filed: Mar. 24, 1992

[51] Int. Cl.$^5$ .............................. C07C 319/08
[52] U.S. Cl. .......................... 568/71; 568/70
[58] Field of Search ..................... 568/70, 71

[56] References Cited

U.S. PATENT DOCUMENTS

| | | | |
|---|---|---|---|
| 2,435,545 | 2/1948 | Lyon | 260/609 |
| 2,786,079 | 3/1957 | Folkins | 260/609 |
| 2,820,060 | 1/1958 | Folkins | 260/609 |
| 2,820,061 | 1/1958 | Folkins | 260/609 |
| 2,822,400 | 2/1958 | Cinque et al. | 568/71 |
| 2,829,171 | 4/1958 | Doumani | 568/71 |
| 2,950,323 | 8/1960 | Loev et al. | 260/609 |
| 3,006,966 | 10/1961 | Doumani | 260/609 |
| 3,035,097 | 5/1962 | Deger et al. | 260/609 |
| 3,954,957 | 5/1976 | Koenig | 423/626 |
| 4,530,917 | 7/1985 | Berrebi | 502/220 |
| 4,725,569 | 2/1988 | Tuszynski et al. | 502/168 |

FOREIGN PATENT DOCUMENTS 517653 7/1953 Canada ................. 568/71

OTHER PUBLICATIONS

"Heterogenous Catalysis in Mercaptan Industrial Synthesis"; Forquy et al. Heterogeneous Catalysis in Fine Chemicals, pp. 91-104, Elsevier Sc. Pub. Amsterdam 1988.

Kirk-Othmer, Ency. of Chem. Tech., 3rd Ed. -vol. 2, pp. 218-244, 1975.

Mashkina et al., "Activity of Tungstate Catalysts in the Synthesis of Methyl Mercaptan from Methanol and Hydrogen Sulfide" React. Kinet. Catal. Lett. (USSR) vol. 36, No. 1, pp. 159-164 (1988).

Ziolek et al., "Reactions of Alcohols with Hydrogen Sulfide Over Zeolites" Zeolites, 1985, vol. 5, (Jul.), pp. 245-250.

"The System of Mineralogy" Palache et al., vol. 1, pp. 663-667 (1944).

*Primary Examiner*—Marianne M. Cintins
*Assistant Examiner*—Margaret Page

[57] ABSTRACT

A process for producing a novel catalyst wherein an amorphous alumina gel is formed at least on the surface of an aluminum-containing material, the gel is heated to form crystalline α- or β-alumina trihydrate and the trihydrate is sulfided, the product of said process, and the method of producing mercaptans from alcohols or ethers and hydrogen sulfide at elevated temperature in the presence of said novel catalyst, are disclosed herein.

8 Claims, 1 Drawing Sheet

SELECTIVE SYNTHESIS OF MERCAPTANS AND CATALYST THEREFOR

BACKGROUND OF THE DISCLOSURE

This invention relates to a process for preparing a catalyst useful for mercaptan synthesis, the catalyst prepared by said process, and the method of using said catalyst in the selective synthesis of mercaptans. More particularly, it relates to the process of preparing $\alpha$- and/or $\beta$-alumina trihydrates on an aluminum containing support or carrier and thereafter sulfiding the trihydrates, the product of said process, and the use of such product in the reaction of alcohols or ethers with hydrogen sulfide at elevated temperature to selectively produce the corresponding mercaptan.

THE PRIOR ART

Gibbsite and Bayerite are known forms of crystallized hydrates of alumina and are also referred to as $\alpha$-alumina trihydrate (CAS Reg. No. 14762-42-3) and $\beta$-alumina trihydrate (CAS Reg. No. 20257-20-9 and 12252-72-1). Boehmite is known as $\alpha$-alumina monohydrate having a CAS Registry No. of 1318-23-6. These materials, their source, manufacture and uses are discussed, for example, in Kirk-Othmer, Encyclopedia of Chemical Technology, 3 Ed., Vol. 2, pp 218-240.

The use of activated alumina and modified forms thereof for catalyzing thiol syntheses is known in the art. For example, for the reaction of methanol and hydrogen sulfide, introduction to the activated alumina catalyst zone of an alkali or alkaline earth metal salt of a carboxylic acid diminishes the loss of catalyst activity (U.S. Pat. No. 2,786,079). The use of an activity promoter including oxides, carbonates, phosphates, halides, sulfides and sulfates of the alkali metals in combination with activated alumina catalyst improves selectivity and yields in the production of thiols (U.S. Pat. No. 2,820,060-1). In recent literature, Mashina et al. claim that, for methyl mercaptan synthesis, $\gamma$-$Al_2O_3$ promoted with alkali metal salts of ortho-tungstic acid gives the highest selectivity to mercaptan production (React. Kinet. Cat. Lett., USSR, Vol. 36, No. 1, pp 159-164 (1988). In contrast, Andruski et al. claim, that for methyl mercaptan synthesis, $\gamma$-$Al_2O_3$ promoted with calcium oxide is the most selective catalyst. ORGANIKA - "Works of the Sci. Inst. of Org. Chem." 1987-8, pp 21-29, Pl ISSN 0137-0933; Translated from Polish.

Sulfiding of various catalysts to improve the activity of the resulting material for specified reactions is known, for example, from U.S. Pat. Nos. 4,530,917 and 4,725,571.

STATEMENT OF THE INVENTION

Figure 1:
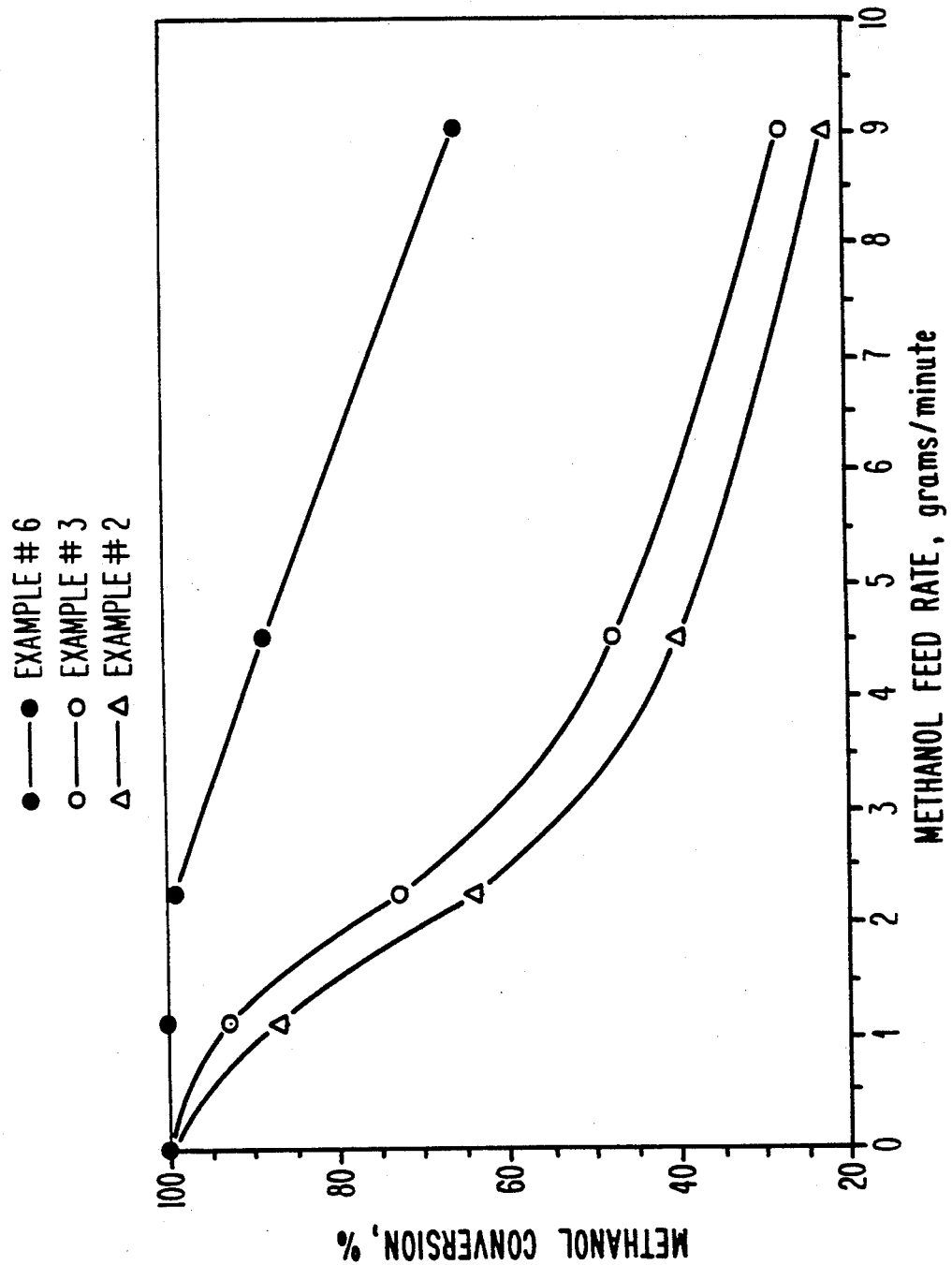
FIG. 1 is a graph which plots methanol conversion against methanol feed rate for the experiments of Examples 2,3 and 6 of the specification.

This invention is a process for preparing a catalyst material which comprises forming an amorphous aluminum gel at least on the surface of (a) a natural aluminum oxide containing mineral, (b) a synthetic aluminum oxide or hydroxide, (c) an aluminum salt or (d) an aluminum alcoholate, heating said gel at an elevated temperature and for a time sufficient to convert said gel into crystalline $\alpha$- and/or $\beta$-alumina trihydrate, treating said trihydrate with a sulfiding agent for a time and at a temperature and pressure sufficient to produce a sulfided product. The invention also includes the product made by the above-described process. Additionally, this invention includes the process of preparing an aliphatic mercaptan by reacting the corresponding alcohol or ether with hydrogen sulfide at elevated temperature in the presence of a catalyst prepared as described above.

DETAILED DESCRIPTION OF THE INVENTION

This invention provides a unique aluminum oxide catalyst for selectively preparing aliphatic mercaptans at a high rate of conversion. The products are preferably aliphatic thiols of the formula RSH where R is a $C_1$-$C_{20}$ hydrocarbon radical, and more preferably a $C_1$-$C_6$ hydrocarbon radical.

The starting alcohols are most preferably selected from those which contain up to six carbon atoms, for example, methyl alcohol, ethyl alcohol, n-propyl alcohol, iso-propyl alcohol, n-butyl alcohol or tert. butyl alcohol. Methanol is the most useful of these starting reactants.

The starting ethers are preferably those having up to 12 carbon atoms and having the formula ROR where R is a hydrocarbon radical. More preferably, R is the same or a different alkyl group having up to 6 carbon atoms. Examples of the ethers include dimethyl ether, diethyl ether, di-n-propyl ether, di-iso-propyl ether, di-n-butyl ether, and methylethyl ether.

Hydrogen sulfide is the preferred sulfur source for this invention. However, carbon disulfide and water may be satisfactorily substituted for hydrogen sulfide according to the equations 1-3.

1) $CS_2 + 2H_2O \longrightarrow 2H_2S + CO_2$

2) $2ROH + 2H_2S \longrightarrow 2RSH + 2H_2O$

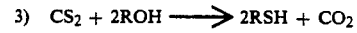

3) $CS_2 + 2ROH \longrightarrow 2RSH + CO_2$

The temperature at which the mercaptan manufacturing process is carried out is an elevated temperature generally ranging from about 225° C. to about 475° C., preferably from about 300° C. to about 375° C.

The pressure of the process is not critical and will generally range between atmospheric and 30 bars, preferably from 2 to 25 bars.

The process may be operated as a batch or as a continuous procedure but a continuous process is preferred.

The catalyst for carrying out the mercaptan manufacturing process, although not difficult to prepare, is quite structurally complex. An amorphous alumina gel is formed at least on the surface of (a) a natural aluminum oxide containing mineral, (b) a synthetic aluminum oxide or hydroxide, (c) an aluminum salt or (d) an aluminum alcoholate. The formation of gels from or on these materials is known in the art and can be obtained by several procedures. For example, a natural aluminum oxide containing mineral, a synthetic aluminum oxide or hydroxide (e.g., boehmite—CAS Reg. No. 1318-23-6), or an aluminum oxide or hydroxide coated support is treated with a concentrated (preferably saturated) aqueous solution of an alkali or alkaline earth metal hydroxide. The treated alumina is allowed to stand at room temperature or at mildly elevated temperature (less than 100° C.) for a time sufficient to complete the formation of a surface gel, e.g., from about 30 minutes to about 3 hours. It is then dried, preferably with heat and in a inert atmosphere such as nitrogen, and, after drying, heated at a temperature ranging between about 25° and below 200° C., preferably 100°-180° C. for a time ranging from about 1 to 48 hours, preferably about 8 to 48 hours to convert the gel to a crystalline product, namely Bayerite ($\alpha$-alumina trihydrate) and/or Gibbsite ($\beta$-alumina trihydrate).

Heating the gel to 200° C. or higher is to be avoided since this will convert the formed trihydrate to a monohydrate (boehmite) which provides a material which lacks the activity and selectivity of the catalyst of this invention.

The alkali metal hydroxide for producing the alumina gel is preferably a sodium, potassium or lithium hydroxide while the alkaline earth metal hydroxide is preferably a calcium or magnesium hydroxide or the like.

The preferred starting material on which to form the gel surface is boehmite which may be prepared, for example, in accordance with U.S. Pat. No. 3,954,957.

Alternatively, the alumina gel is formed on the surface of an aluminum salt or alcoholate as disclosed, for example, in the Kirk-Othmer Encyclopedia of Chem. Tech., 3rd Ed. Vol. 12, pp 218-240. Thus, a gel may be formed on or with an aluminum salt, e.g., aluminum nitrate, by increasing the pH of the normally acidic salt to the alkaline side of neutral, in the presence of water. Aluminum nitrate is also converted to the gel form by hydrolyzing in boiling water.

Alkaline aluminates such as sodium aluminate are hydrolyzed to the alumina gel by reducing the pH of the normally alkaline salt toward neutral.

Aluminum alcoholates e.g., aluminum isopropoxide or aluminum triethoxide, hydrolyze readily in water to give the alumina gel. Aluminum alcoholates also include tritertiary butoxide; other aluminum salts are aluminum chloride and aluminum sulfate.

The sulfiding step may be carried out at any time after formation of the trihydrate but is preferably accomplished in the mercaptan-forming reaction zone, just prior to the use of the catalyst in the reaction of an alcohol or ether with $H_2S$ to produce a mercaptan. In the preferred form of the invention, the trihydrate catalyst precursor is sulfided by treatment with a continuous stream of hydrogen sulfide ($H_2S$) at atmospheric to elevated pressure (200-500 psig) and at ambient or slightly elevated temperature (e.g. up to 35° C.) for from 8 to 16, preferably 10-14 hours. However, sulfiding can be accomplished at much higher temperature, e.g., 350° C. and up to the maximum mercaptan manufacturing process temperature. Thus the alumina can be heated, under substantially the same pressure, to the reaction temperature (mercaptan-forming temperature 225°-475° C.) in the presence of H2S, the catalyst becoming immediately available at the start of the mercaptan-forming reaction.

Alternatively, the trihydrate catalyst precursor may be sulfided with other sulfiding agents common in the art, for example, methyl mercaptan, dialkyl sulfide or dialkyl polysulfide and combinations of these, e.g., as described in U.S. Pat. No. 4,725,571. Sulfiding is a procedure in which sulfur compounds are formed or deposited at least on the surface of the catalyst in an amount ranging from about 0.1 to about 1% or more based on the total weight of the catalyst material.

EXAMPLES

The following detailed examples are given to more fully demonstrate and describe the present invention. Examples 1 through 5 while not representative of the present invention are included for comparative purposes and illustrate the relatively poor selectivity and generally lower conversion obtained by catalysts described in the prior art for methyl mercaptan synthesis. Example 6 describes the preparation of the preferred catalyst of this invention and its use in the synthesis of methyl mercaptan. Example 7 demonstrates the criticality of the drying temperature in the manufacture of the aluminum oxide precursor for the catalyst of this invention. Example 8 illustrates the selective preparation of n-propyl mercaptan from n-propyl alcohol using the catalyst of this invention. Example 9 describes the use of carbon disulfide and water to generate $H_2S$ in situ during methyl mercaptan synthesis with methyl alcohol.

The examples compare the various catalysts in terms of conversion and selectivity. Selectivity is directly measured in terms of the ratio of methyl mercaptan (the desired product) to dimethyl sulfide (the only significant by-product). Conversion, under a fixed set of operating conditions, is an indirect measure of catalyst activity or conversion rate.

FIG. 1 of the accompanying drawing shows the relationship between rate of conversion and percent conversion for Examples 2, 3 and 6. The graph illustrates the dramatic difference in conversion rates between catalysts which differ in percent conversion, at high conversion (87 to 100%), by only a few percentage points (8 to 12%).

The by-products produced during methyl mercaptan synthesis are dimethyl sulfide and dimethyl disulfide, with dimethyl sulfide being the only one produced in significant quantities.

Because of the difficulty in purification, any commercial mercaptan unit will be operated at a contact time sufficient to essentially consume all of the alcohol or ether reactant.

EXAMPLE 1 (COMPARATIVE)

The apparatus employed for the experiment of this example was constructed of 316 stainless steel. The alcohol and other normally liquid feeds were metered as liquids by means of an HPLC pump(s), a low-volume, high pressure, extremely precise metering pump designed for use in high pressure liquid chromatography. The hydrogen sulfide was metered as a gas by means of a mass flow controller. After metering, the liquid reactants were vaporized by an electrically heated flash evaporator, mixed, and passed into a combination preheater/reactor. The preheater/reactor consisted of a ⅜" ID ×36" stainless steel tube, fitted with thermocouples, and was immersed in a eutectic salt bath for temperature control. The preheater portion of the tube was filled with 130 g of 3 mm glass beads, and the reactor portion was filled with 25 cc of ⅛" catalyst particles. A portion of the hot effluent from the reactor was passed directly into an automated GC (Gas Chromatography) process analyzer, for analysis.

This example illustrates the use of a commercial, pure precipitated Boehmite [$\alpha$-AlO(OH)] catalyst (0.3% $Na_2O$) for producing methyl mercaptan. Using the above described apparatus, the reactor was charged with 19.4 g (25 cc) of Alcoa F-200 alumina, which was sulfided with hydrogen sulfide for 12 hours at a pressure of 1 bar and a temperature of 350° C. A mixture of hydrogen sulfide (1.13 gpm) and methanol (0.25 gpm) was then passed over the catalyst at a pressure of 250 psig and a bed temperature of 335° C. The methanol conversion was 99.0% and the ratio of methyl mercaptan to dimethyl sulfide was 20/1.

EXAMPLE 2 (COMPARATIVE)

This example illustrates the use of a commercial alkali metal oxide (4.4% $Na_2O$) promoted alumina catalyst for producing methyl mercaptan. Using the apparatus described in Example 1, the reactor was charged with 18.7 g (25 cc) of Alcoa SP-400 alumina, and sulfided with hydrogen sulfide as in Example 1. The reaction conditions employed were also identical to Example 1. The methanol conversion was 87.2%, and the ratio of methyl mercaptan to dimethyl sulfide was 28/1.

EXAMPLE 3 (COMPARATIVE)

This example illustrates the use of a commercial alkaline earth oxide (8.4% Cao) promoted alumina catalyst for producing methyl mercaptan. Using the apparatus described in Example 1, the reactor was charged with 20.3 g (25 cc) of LaRoche S-501 alumina, and sulfided with hydrogen sulfide as in Example 1. The reaction conditions employed were also identical to Example 1. The methanol conversion was 92.4%, and the ratio of methyl mercaptan to dimethyl sulfide was 24/1.

EXAMPLE 4 (COMPARATIVE)

This example illustrates the use of a heteropoly acid, alkali metal salt promoted alumina (2% potassium phosphotungstate) catalyst for producing methyl mercaptan. Using the apparatus described in Example 1, the reactor was charged with 2 g (25 cc) of Alcoa F-1 alumina promoted with 2% potassium phosphotungstate, and sulfided with hydrogen sulfide as in Example 1. The reaction conditions employed were also identical to Example 1. The methanol conversion was 94.1%, and the ratio of methyl mercaptan to dimethyl sulfide was 26/1.

EXAMPLE 5 (COMPARATIVE)

This example illustrates the use of a commercial, acidic, pure alumina (0.035% $Na_2O$) catalyst for producing methyl mercaptan. Using the apparatus described in Example 1, the reactor was charged with 10.7 g (25 cc) of Davison HSA alumina, and sulfided with hydrogen sulfide as in Example 1. The reaction conditions employed were also identical to Example 1. The methanol conversion was 96.3%, and the ratio of methyl mercaptan to dimethyl sulfide was 3.2/1.

EXAMPLE 6 (CATALYST PREPARATION)

This example illustrates the method for preparing the catalyst of this invention, its analysis, and its application for the selective synthesis of methyl mercaptan.

A sample of Alcoa F-200 alumina (¼″ spheres) was analyzed by XRD (X-Ray Diffraction) and found to be very fine grained Boehmite [$\alpha$-AlO(OH)]. SEM Micrographs (1000× magnification) shows a glassy undulating surface with no regular features, with some loose granular particles adhering to the exterior surface. In contrast, the interior is more porous and appears to contain discrete particles which range in size from sub-micron to greater than 15 microns.

A 100 g sample of the Alcoa F-200, analyzed above, was weighed out and vacuum impregnated with 2.5 g of potassium hydroxide dissolved in 50 cc of distilled water. The sample was then allowed to stand at 21° C. for 2 hours, dried in a stream of nitrogen, dried in an oven at 110° C. for 1 hour then dried 48 hours at 165° C.

XRD analysis now showed in addition to Boehmite [$\alpha$-AlO(OH)], two new phases, Bayerite [$\alpha$-Al(OH)$_3$] and Gibbsite [$\beta$-Al(OH)$_3$]. SEM Micrographs (1000× magnification) showed the external surface to be entirely covered with well developed faceted crystals. Individual crystallites varied in size from 35 microns to less than one micron. The interior surface appeared highly densified in comparison to the exterior surface. No discrete particles were readily distinguishable.

Using the apparatus described in Example 1, the reactor was charged with 18.9 g (25 cc) of the above prepared material which was then sulfided with hydrogen sulfide as in Example 1 to produce the catalyst. After sulfiding, the reaction was carried out on a continuous basis for 300 hours, employing conditions and reactants identical to Example 1. The methanol conversion was 100%, no unreacted methanol was detected in the product stream, and the ratio of methyl mercaptan to dimethyl sulfide was 74/1.

EXAMPLE 7 (CRITICALITY OF GEL HEATING TEMP.)

This example illustrates the effect of the final drying temperature on the surface structure of the alumina and its efficacy for the selective synthesis of methyl mercaptan. The fabrication of this proposed catalyst was carried out from the same materials, in the same amounts, and under the same conditions as those employed in Example 6, with the exception that the final drying temperature was 250° C. rather than the previous 165° C.

Analysis of the resulting alumina by XRD showed only very fine grained Boehmite [$\alpha$-AlO(OH)], identical to the Alcoa F-200 starting material. SEM Micrographs (1000× magnification) showed the alumina surface to be very similar to that of the starting material.

The resulting alumina was sulfided as described in Example 1 and methyl mercaptan synthesis was carried out under the conditions employed in Example 6. Methanol conversion was only 52%, which is far too low to be practical.

EXAMPLE 8 (PREPARATION OF N-PROPYL MERCAPTAN)

This example illustrates the selective preparation of n-propyl mercaptan from n-propyl alcohol, using the catalyst of this invention. The catalyst, equipment, reactants and procedure are identical to that used in Example 6, with the exception that n-propyl alcohol replaced methyl alcohol, the reaction temperature was maintained at 315° C., and the product was isolated in a cold trap and analyzed by GC-MS. The n-propyl alcohol conversion was about 55%. The product was >98% n-propyl mercaptan. Trace amounts <0.2% of the following organic compounds were identified: isopropyl mercaptan, n-propyl ether, n-propyl sulfide, n-propyl disulfide, and n-propyl trisulfide. In contrast to other catalysts known in the art, only trace amounts of the iso-propyl by-products were produced.

EXAMPLE 9 ($CS_2$ SOURCE OF $H_2S$)

This example illustrates the versatility of the catalyst of this invention in using $CS_2$ and $H_2O$ as a source of H₂S for methyl mercaptan synthesis. The reaction was carried out under the conditions and with the reactants used in Example 6, with the following exceptions: A new catalyst batch was used in which the final drying temperature was 145° C. vs. the preferred 165° C.; the H₂S feed was reduced from 1.126 gpm to 0.56 gpm, CS₂ was fed at 0.63 gpm and H₂O was fed at 0.30 gpm. All of the CS₂ was converted to CO₂ and H₂S. With the exception of a large carbon dioxide peak on GC chromatogram, results were very similar to those obtained in Example 6. Methyl alcohol conversion was 100% and the ratio of MESH/DMS was 45/1.

The following table is set forth to allow a ready comparison of conversions (% MEOH Conv.) and selectivities (MeSH/DMS) produced in the foregoing examples. Under the heading "Catalyst" the materials used in the foregoing examples to catalyze the reaction are named. These materials or the calcination (drying) temperature during catalyst preparation are identified in the column headed "Comments."

TABLE 1

| Example | Catalyst | % MeOH Conv. | MeSH/ DMS | Comments** |
|---|---|---|---|---|
| 1 | Alcoa F-200 | 99 | 20/1 | Boehmite,γ-AlO(OH) |
| 2 | Alcoa SP-400 | 87.2 | 28/1 | Alkali Metal Oxide Promoter(4.4% Na₂O) |
| 3 | LaRoche S-501 | 92.4 | 24/1 | Alkaline Earth Metal Oxide promoter 8.4% CaO |
| 4 | Alcoa F-1 2% KPT | 94.1 | 26/1 | Heteropoly acid, alkali metal salt Promoted alumina |
| 5 | Davison HSA | 96.3 | 3.2/1 | Acidic, pure alumina |
| 6 | Lab Prep #1* | 100 | 74/1 | Calcine @ 165° C. |
| 7 | Lab Prep #2 | 52 | NM | Calcine @ 250° C. |
| 8 | Lab Prep #1 | 55 | 75/1 | N-Propyl Mercaptan product |
| 9 | Lab Prep #3 | 100 | 45/1 | Calcine @ 145° C. CS₂/H₂O H₂S + CO₂ |

NM = Not Measured
*Catalyst prepared by the method of this invention
**Catalyst or Process Conditions or Product

What is claimed is:

1. A process for the manufacture of aliphatic mercaptans by the reaction of an aliphatic alcohol or ether having 1 to 20 carbon atoms with hydrogen sulfide at an elevated temperature ranging from about 225° to about 475° C. and in the presence of a catalyst prepared by converting at least the surface of (a) a natural aluminum oxide containing material, (b) a synthetic aluminum oxide or hydroxide, (c) an aluminum salt or (d) an aluminum alcoholate to an amorphous alumina gel, drying said gel, heating the dried gel at a temperature between about 25° and less than 200° C. and for a duration sufficient to convert said gel into a crystalline α- and/or β-alumina trihydrate, and treating said trihydrate with a sulfiding agent at a temperature ranging from ambient up to 475° C., a pressure ranging from atmospheric up to 500 psig and for a time sufficient to produce a sulfided product.

2. The process of claim 1 wherein said catalyst is prepared from boehmite.

3. The process of claim 2 wherein said gel surface is heated to a temperature within the range of about 100° C. to about 180° C. for from about 8 to about 48 hours.

4. The process of claim 3 wherein said sulfiding agent is hydrogen sulfide.

5. The process of claim 4 wherein the pressure during sulfiding is from about 200 to about 500 psig, the temperature is from about ambient to about 350° C. and the time is from about 8 to about 16 hours.

6. The process of claim 5 wherein said mercaptan is manufactured by the reaction of an alkyl alcohol having from 1 to 6 carbon atoms.

7. The process of claim 5 wherein said mercaptan is manufactured by the reaction of an alkyl ether having from 1 to 6 carbon atoms in the alkyl group.

8. The process of claim 6 wherein sail alkyl alcohol is methanol.

* * * * *